United States Patent [19]

Kubota

[11] Patent Number: 4,590,409
[45] Date of Patent: May 20, 1986

[54] CONTROL SYSTEM FOR A POWER STEERING MOTOR OF A BATTERY OPERATED VEHICLE

[75] Inventor: Toru Kubota, Koganei, Japan

[73] Assignee: Nissan Motor Co., Ltd., Yokohama, Japan

[21] Appl. No.: 629,756

[22] Filed: Jul. 13, 1984

Related U.S. Application Data

[63] Continuation of Ser. No. 313,473, Oct. 21, 1981, abandoned.

[30] Foreign Application Priority Data

Oct. 29, 1980 [JP] Japan ................ 55-151690

[51] Int. Cl.⁴ .............................. B62D 5/06
[52] U.S. Cl. ........................ 318/139; 180/6.28; 180/132; 180/142
[58] Field of Search ............ 318/139, 255, 34, 318/68, 113, 472, 489; 180/79.1, 6.28, 142, 6.2, 6.24, 6.26, 65.1, 65.2, 132, 141

[56] References Cited

U.S. PATENT DOCUMENTS

| | | | |
|---|---|---|---|
| 3,885,204 | 5/1975 | Abels et al. | 318/139 |
| 4,008,779 | 2/1977 | Shinoda et al. | 318/139 X |
| 4,350,219 | 9/1982 | Olbrich et al. | 318/68 X |
| 4,418,778 | 12/1983 | Sato et al. | 318/139 X |

FOREIGN PATENT DOCUMENTS

| | | | |
|---|---|---|---|
| 2758308 | 7/1979 | Fed. Rep. of Germany | 180/79.1 |
| 57-13904 | 1/1982 | Japan | 318/139 |
| 1534542 | 12/1978 | United Kingdom . | |
| 2030529 | 4/1980 | United Kingdom . | |
| 2060522 | 5/1981 | United Kingdom . | |

Primary Examiner—William M. Shoop, Jr.
Assistant Examiner—Bentsu Ro
Attorney, Agent, or Firm—Schwartz, Jeffery, Schwaab, Mack, Blumenthal & Evans

[57] ABSTRACT

An improved control system for a power steering motor of a power steering system of a battery operated vehicle having a wheel drive motor to which a power steering motor is connected for operation. In order to maintain operation of the power steering system during periods when the vehicle is coasting or stationary, a circuit means including a sensing switch responsive to a released condition of the vehicle brakes is provided to energize the power steering motor when the vehicle brakes are released.

4 Claims, 2 Drawing Figures

1

CONTROL SYSTEM FOR A POWER STEERING MOTOR OF A BATTERY OPERATED VEHICLE

This application is a continuation of application Ser. No. 313,473, filed Oct. 21, 1981, now abandoned.

BACKGROUND OF THE INVENTION

1. Field of the Invention

The present invention relates to a control system for a power steering motor of a power steering system for use with a battery operated vehicle, such as a battery operated forklift.

2. Description of the Prior Art

A power steering system for a battery operated vehicle such as a forklift typically has a drive motor for a hydraulic pump (referred to hereinafter as a power steering motor). Such power steering motors are generally supplied with electric power through a wheel drive motor control circuit.

Specifically, the control circuit for the wheel drive motor may include two pair of relay switches connected between a battery and the wheel drive motor, and operated by a forward movement switch and a reverse movement switch to permit manual selection of the direction of movement of the vehicle. In addition, the power steering motor may be connected to one of the relay switches in order to receive current from the battery through the control circuit for the wheel drive motor.

This type of control system, suffers from a disadvantage in that the operation of the power steering system may be effected only when the forward movement switch or the reverse movement switch of the control circuit is closed or active. In other words, the power steering system is rendered inoperative when the battery operated vehicle is coasting or stationary and both of the forward movement switch and the backward movement switch are open or inactive.

SUMMARY OF THE INVENTION

It is therefore an object of the present invention to provide a control system in which the power steering system is operational whenever needed by the vehicle operator, even if both the forward movement switch and the reverse movement switch are open or inactive.

According to the present invention, a control system is provided for a power steering motor of a power steering system and for a wheel drive motor of a battery operated vehicle having a brake and an accelerator the control system comprises a drive circuit including a battery, the wheel drive motor, and a drive motor switch connected in series with the wheel drive motor. The drive motor switch closes in response to the actuation of the accelerator. A drive switching means is provided having a portion thereof in the drive circuit and having a forward drive position and a reverse drive position for driving the wheel drive motor in cooperation with the drive motor switch in a forward direction and in a reverse direction, each of the forward and reverse drive positions also driving the power steering motor independently of the drive motor switch. The drive switching means also has a neutral position. A brake switching means is interconnected with the brake for causing the drive switching means to change from its neutral position to either the forward or reverse drive position when a released condition of the brake is detected, whereby the power steering motor may be energized by the drive switching means independently of the actuation of the wheel drive motor by the cooperating drive motor switch.

According to another aspect of the invention, the control system further comprises means for preventing the forward and reverse drive positions from being selected simultaneously during the operation of the brake switching means.

DESCRIPTION OF THE PREFERRED EMBODIMENTS

Figure 1:
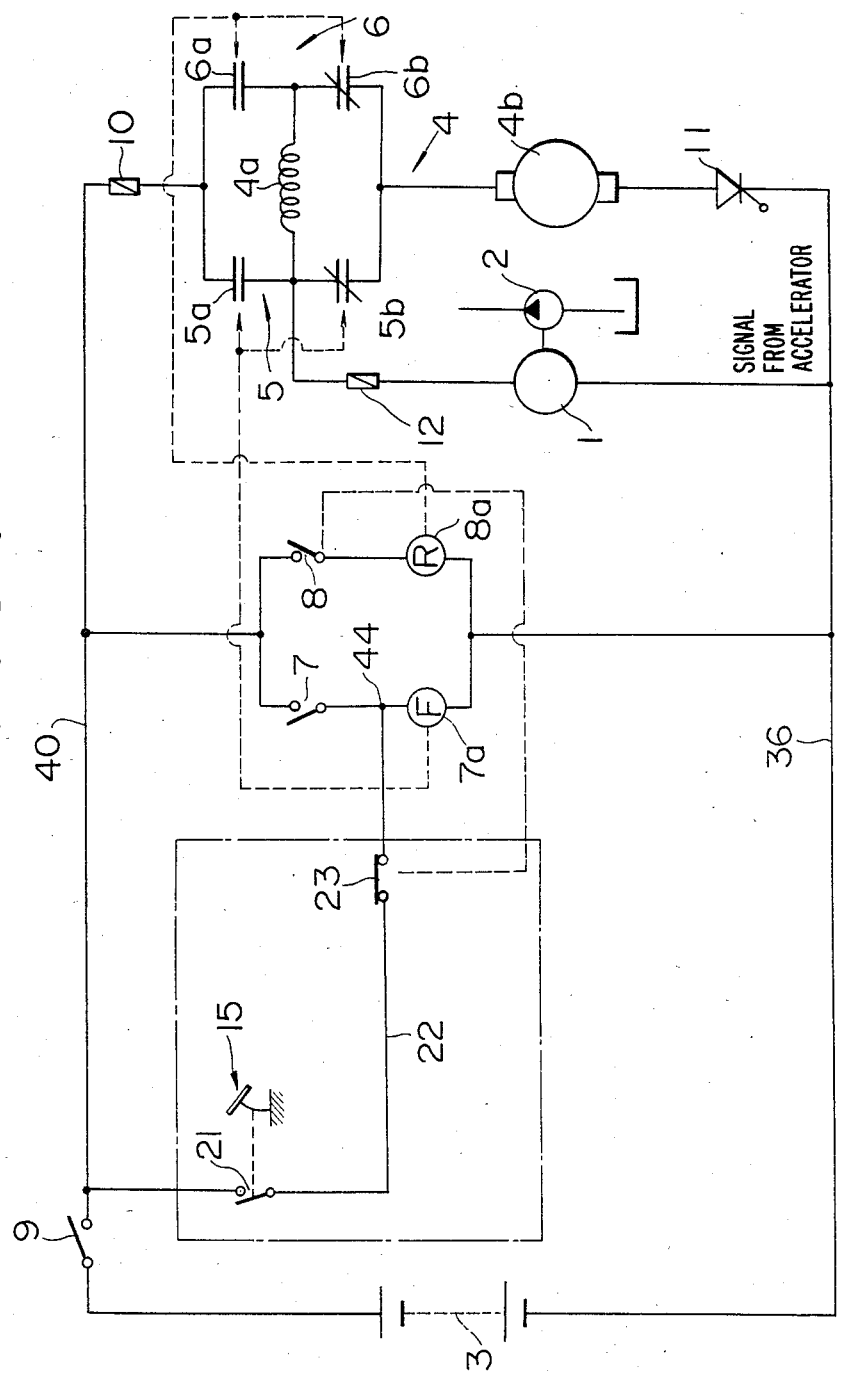
FIG. 1 is a circuit diagram of a first embodiment of a control system of power steering motor according to the present invention.

In FIG. 1, a first preferred embodiment of a control system for a power steering motor of a control system for a reach type battery operated forklift is set forth as an example. The control system comprises a power steering motor 1 for driving a hydraulic pump 2, an electrical power source such as a battery 3, and a wheel drive motor generally denoted by the numeral 4. The motor 4 is a DC motor having a field coil 4a and an armature 4b. First and second relay switch arrangements 5 and 6, each having a normally open switches 5a and 6a and normally closed switches 5b and 6b are provided between the battery 3 and the wheel drive motor 4. The field coil 4a is connected between the normally open and normally closed switches 5a and 5b of the first relay switch arrangement 5 and the normally open and normally closed switches 6a and 6b of the second relay switch arrangement 6. The normally open contacts 5a and 6a are commonly connected to the positive terminal of the battery 3 via a resistor 10, by means of a power line 40 and a key switch 9.

Similarly, the normally closed contacts 5b and 6b are commonly connected to one terminal of the armature 4b of the wheel drive motor 4. A thyrister 11, which functions as a drive motor switch, is interposed between the other terminal of the armature 4b and a ground line 36, and operates to control the current to the wheel drive motor 4.

This control system further comprises a forward movement or drive switch 7 with an actuator coil 7a for the first relay switch 5 and a reverse movement arrangement or drive switch 8 with an actuator coil 8a for the second relay switch arrangement 6.

The forward movement switch 7 and the actuator coil 7a are connected in series as are the reverse movement switch 8 and the actuator coil 8a. One terminal of each of the forward movement switch 7 and the reverse movement switch 8 are commonly connected to the power line 40 between the key switch 9 and the resistor 10. Similarly, one terminal of each of the actuator coils 7a and 8a are connected to the ground line 36.

The manner of control of the wheel drive motor 4 will now be explained. When an operator of the battery operated forklift or other electrically powered vehicle closes the forward movement switch 7, the actuator coil 7a is energized to close the normally open switch 5a and to open the normally closed switch 5b. Thus the current flows through the resistor 10, the switch 5a, field coil 4a, the normally closed switch 6b, the armature 4b and the thyrister 11, to the ground.

Similarly, when the operator of the battery operated forklift closes the reverse movement switch 8, the second actuator coil 8a is energized to close the normally open switch 6a and to open the normally closed switch 6b. In this case, current flows through the resistor 10, the switch 6a, the field coil 4a, the normally closed switch 5b, the armature 4a, and the thyrister 11 to the ground. In the latter case, the wheel drive motor 4 will rotate in a reverse direction from the first case due to the change in the direction of the current through the field coil 4a.

In this way, the rotation of the wheel drive motor and the direction thereof is controlled in accordance with the operation of the forward movement switch 7 or the reverse movement switch 8. In addition, the wheel drive motor is controlled by means of the thyrister 11 in accordance with a control signal derived, for example, from the vehicle accelerator pedal and applied to a gate thereof. Thus, only during actuation of the accelerator pedal is the wheel drive motor circuit closed.

Turning to the power steering motor circuit, a terminal of the power steering motor 1 is connected via the resistor 12 to a junction of the normally open switch 5a and the normally closed switch 5b. Therefore, the current to the power steering motor 1 is supplied through the switch 5a when the forward movement switch 7 is closed or through the switch 6a and the field coil 4a when the reverse movement switch 8 is closed. Thus the power steering motor 4 is operated to drive the hydraulic pump 2 for supplying hydraulic power to a power steering hydraulic circuit.

In addition to the above circuit elements, this control system is provided with a sensing switch 21 suitably disposed for detecting the released condition pedal 15 of the brake of the battery operated vehicle.

In a case of the battery operated forklift or the like, the brake activator is usually constructed so that the braking operation is effected when a brake pedal 15 is released. Therefore, the switch 21 is preferably disposed to sense the depressed condition of the brake pedal 15.

This sensing switch 21 closes whenever the vehicle operator steps on the brake pedal 15 to release the brakes, and it is turned off when the operator releases the brake pedal for applying the brakes.

One side of the sensing switch 21 is connected to the battery 3 via the key switch 9, and the other side of a sensing switch 21 is connected to the junction 44 between the forward movement switch 7 and the actuator coil 7a via a normally closed switch 23.

The switch 23 is interconnected with the reverse movement switch 8 by a suitable interconnecting mechanism, and it opens whenever the switch 8 is closed by the manual operation of the operator. Conversely it closes whenever the switch 8 is open.

In operation, current flows through the sensing switch 21 and the normally closed switch 23 thereby energizing activator coil 7a and effecting the operation of the power steering motor 1 during periods when both the forward movement switch 7 and the reverse movement switch 8 are open.

Assuming that both of the forward movement switch 7 and the reverse movement switch 8 are opened by the operator initially. In this state, when the operator desires to steer the vehicle, he depresses brake pedal 15 to release the brakes. Thereupon, the sensing switch 21 closes and a current flows through switches 21 and 23 to energize the actuator coil 7a and close the normally open switch 5a to supply a current to the power steering motor 1.

Thus, the operator's requirement for power steering is sensed by the sensing switch 21 and energization of the power steering system is initiated.

Subsequently, if the operator closes the forward movement switch 7, the actuator coil 7a remains energized and the current to the power steering motor 1 through the switch 5a remains unchanged.

Conversely, if the reverse movement switch 8 is closed by the operator, the switch 23 opens to de-energize the actuator coil 7a, thereby prevent the forward movement activator coil 7a and the reverse movement activator coil 8a from being energized at the same time.

In this state, the current to the power steering motor 1 is supplied through the normally open switch 6a and the field coil 4a of the wheel drive motor 4. Thus, continuous operation of the power steering system is maintained.

Similarly, when the battery operated forklift or other vehicle is coasting, and both the forward movement switch 7 and the reverse movement switch 8 are open, operation of the power steering system is maintained as long as the brake pedal is depressed thereby releasing the brakes.

Figure 2:
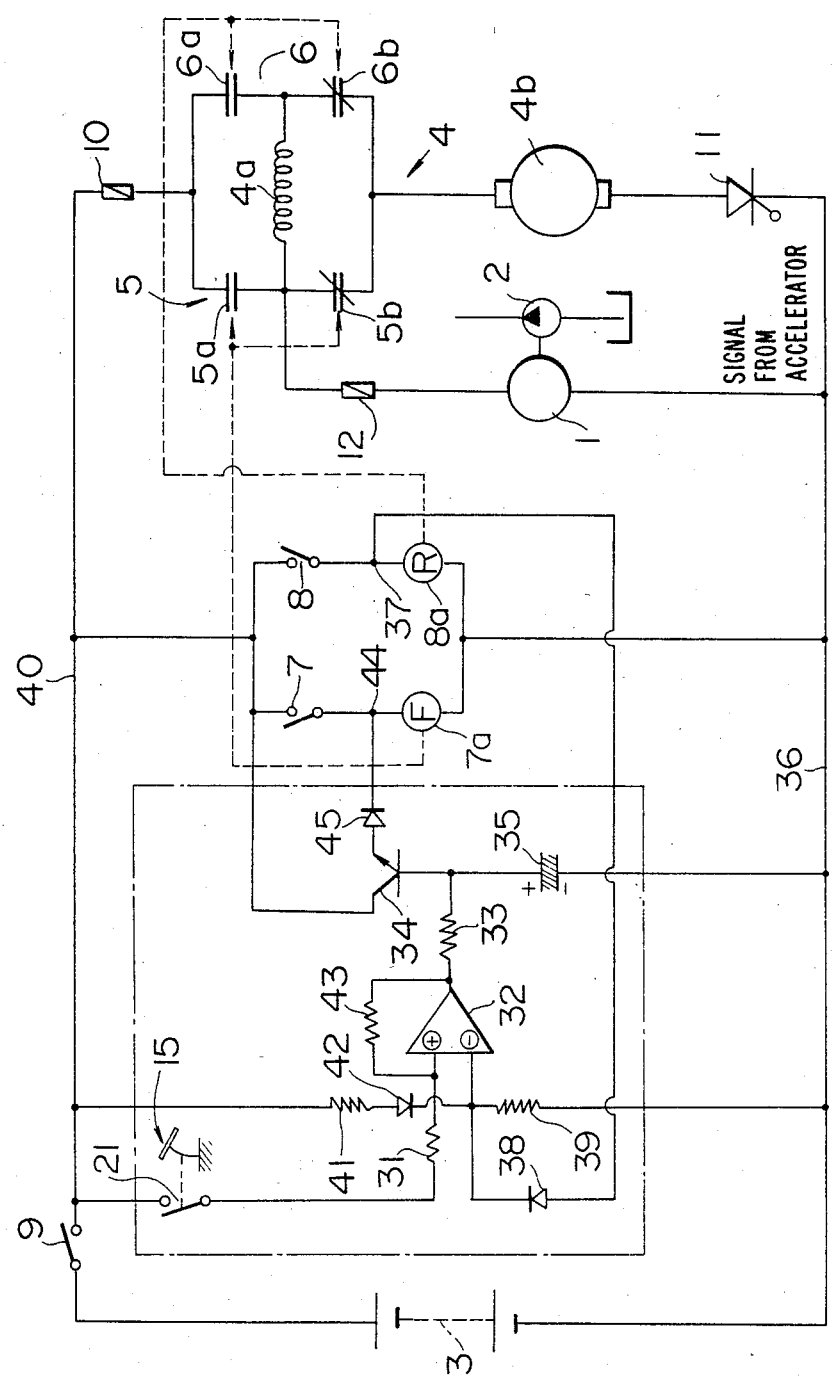
FIG. 2 is a circuit diagram of a second embodiment of a control system of power steering motor according to the present invention.

Referring now to FIG. 2, a second embodiment according to the present invention is explained. This embodiment features the replacement of the normally closed switch 23 in FIG. 1 by a control circuit including an operational amplifier and a transistor. The other portions of the control system are identical with the first embodiment shown in FIG. 1. The second embodiment is explained with reference to FIG. 2, in which like reference numerals are used to designate the equivalent or corresponding elements to FIG. 1.

The control circuit which replaces switch 23 comprises a comparator 32 which receives a signal from both the sensing switch 21 and the reverse movement switch 8 and further includes a transistor 34 disposed between an output terminal of the comparator 32 and the actuator coil 7a of the forward movement switch 7. The sensing switch 21 is identical with the sensing switch used in the first embodiment shown in FIG. 1. A terminal thereof is connected to the key switch 9 and the other terminal thereof is connected to a first terminal of the comparator 32 via a resistor 31. A second input terminal of the comparator 32 receives a reference voltage produced by dividing the battery voltage using a series circuit comprising resistor 41 connected to the line 40 in series with resistor 39 which is connected to the ground line 36. A diode 42 is disposed between the resistors 41 and 39 for blocking any reverse current. A steering diode 38 is also connected between the second input of the comparator 32 and the junction 37 between the reverse movement switch 8 and the actuator coil 8a.

An output terminal of the comparator 32 is connected to the base of the transistor 34 via a resistor 33. A resistor 43 is also connected between the output terminal and the first terminal of the comparator 32. A capacitor 35 is connected between the base of the transistor 34 and ground. The collector of the transistor 34 is connected to the line 40 and the emitter thereof is connected to the junction 44 between the forward movement switch 7 and the actuator coil 7a.

The operation of this control circuit will now be explained. As in the previous case, if the operator of the battery operated forklift or the like steps on the brake pedal before starting, the sensing switch is closed, thus supplying a high level voltage to the first input terminal of the comparator 32. As a consequence, the voltage level of the first input terminal becomes higher than that of the second input terminal. The comparator 32 thereupon produces a high level output signal and the capacitor 35 is charged through resistor 33.

When the voltage level of the base of the transistor reaches a predetermined value, the transistor 34 turns conductive and a current flows through the transistor 34 and the diode 45 to the actuator coil 7a. Thus, the actuator coil 7a is energized to initiate operation of the power steering system.

In this state, if the reverse movement switch 8 is closed, current flows from the junction 37 to the second input terminal of the comparator 32 through the diode 38. Therefore, the voltage level of the second input terminal of the compartor 32 increases nearly to the battery voltage and the comparator 32 produces a low level output signal. As a result, the voltage at the base of the transistor 34 is reduced rendering the transistor non-conductive to thereby de-energize the actuator coil 7a.

From the foregoing, is should be appreciated that this control circuit provides similar operation as the sensing switch 21 and the normally closed switch 23 of the first embodiment.

In addition, the resistor 33 and the capacitor 35 form a time constant circuit for preventing the transistor 34 from frequently turning on and off within a short period of time, which may otherwise occur due to frequent use of the brake. The steering diode 38 is used preventing the actuator coil 8a from being energized by the current flowing through resistor 41 and diode 42. The diode 45 protects the transistor 34 from any voltages developed at junction 44.

It should be noted that the embodiment of FIG. 2 has a further advantage that it does not require any mechanism for interlocking the switch 23 and the reverse movement switch 8.

Although the invention is explained in the first and second embodiments in accordance with a construction where the switch assembly 5 is controlled by the switches 21, 23 or the control circuit, the system may be constructed so that the switch assembly 6 is controlled by the switches 21, 23 or the control circuit. With regard to the embodiment of FIG. 1 this would only entail connecting the junction between switches 6a and 6b to the junction between switch 8 and actuator 8a. Further, switch 7 (instead of switch 8) should be manually interconnected with switch 23. With reference to the embodiment of FIG. 2 it would only be necessary to interchange the connection of junctions 37 and 44 to achieve the desired modification.

What is claimed is:

1. A control system for a wheeled vehicle having an electrical power source, an electric wheel drive motor, a power steering system operatively connected with said wheel drive motor, a power steering motor, and accelerator pedal, and a brake pedal having a brake apply position and a brake release position, comprising:
   a power steering motor energization circuit, responsive to said brake pedal for energizing said power steering motor from said electrical power source when said brake pedal assumes said brake release position;
   a wheel drive motor control circuit including:
   (a) means responsive to the depression of said accelerator pedal for energizing said wheel drive motor from said electrical power source;
   (b) forward drive switch means having an inactive state and an active state wherein, when said accelerator pedal is depressed, said wheel drive motor is energized to rotate in a forward drive direction; and
   (c) reverse drive switch means having an inactive state and an active state wherein, when said accelerator pedal is depressed, said wheel drive motor is energized to rotate in a reverse drive direction;
   said power steering motor being responsive to said forward and reverse drive switch means so as to be energized by said power source when one of said forward drive switch means and said reverse drive switch means is in its active state;
   said forward drive switch means comprising a first manually operable switch and a first activator coil connected to said first switch and energized whenever said first switch is closed, said first activator coil forming part of a first relay for connecting said wheel drive motor to said electrical power source so that said wheel drive motor rotates in said forward drive direction, and wherein said reverse drive switch means comprises a second manually operable switch and a second activator coil connected to said second switch and energized whenever said second switch is closed, said second activator coil forming part of a second relay which connects said wheel drive motor with said electrical power source so that said wheel drive motor rotates in said reverse drive direction; and
   wherein said power steering motor energization circuit comprises:
   a third switch connected to said electrical power source and operable to close whenever said brake pedal assumes said brake release position, said third switch being open whenever said brake pedal assumes said brake apply position, and a fourth switch operable to close when said second switch is open and to open when said second switch is closed, said third and fourth switches and one of said first and second activator coils being connected in series so that when said third and fourth switches are closed, said one of said first and second activator coils is energized.

2. A control system for a wheeled vehicle having an electrical power source, an electric wheel drive motor, a power steering system operatively connected with said wheel drive motor, a power steering motor, and accelerator pedal, and a brake pedal having a brake apply position and a brake release position, comprising:
   a power steering motor energization circuit, responsive to said brake pedal for energizing said power steering motor from said electrical power source when said brake pedal assumes said brake release position;
   a wheel drive motor control circuit including:
   (a) means responsive to the depression of said accelerator pedal for energizing said wheel drive motor from said electrical power source;
   (b) forward drive switch means having an inactive state and an active state wherein, when said accelerator pedal is depressed, said wheel drive motor is energized to rotate in a forward drive direction; and (c) reverse drive switch means having an inactive state and an active state wherein, when said accelerator pedal is depressed, said wheel drive motor is energized to rotate in a reverse drive direction;

said power steering motor being responsive to said forward and reverse drive switch means so as to be energized by said power source when one of said forward drive switch means and said reverse drive switch means is in its active state;

said forward drive switch means comprising a first manually operable switch and a first activator coil connected to said first switch and energized whenever said first switch is closed, said first activator coil forming part of a first relay for connecting said wheel drive motor to said electrical power source so that said wheel drive motor rotates in said forward drive direction, and wherein said reverse drive switch means comprises a second manually operable switch and a second activator coil connected to said second switch and energized whenever said second switch is closed, said second activator coil forming part of a second relay which connects said wheel drive motor with said electrical power source so that said wheel drive motor rotates in said reverse drive direction, and wherein said power steering energization circuit comprises:

a third switch connected to said electrical power source and operable to close when said brake pedal assumes said brake release position, said third switch being open when said brake pedal assumes said brake apply position;

a comparator having first and second input terminals, said first input terminal being connected to said third switch to receive a signal therefrom when said third switch is closed, said second input terminal being connected to receive a voltage applied to one of said first or second activator coils; and a referee voltage, said comparator being operable to generate a high output whenever the signal from said third switch is compared to said referee voltage and a low output whenever the signal from said third switch is compared with the voltage to one of said activator coils, and an electronic switch means, responsive to a high output from said comparator to energize said power steering motor.

3. The control system of claim 2 wherein said electric switch means comprises:

a time delay circuit;

a switching transistor having an emitter, a base and a collector, said base being connected to the output terminal of said comparator and to said time delay circuit, said collector being connected to said electrical power source and said emitter being connected to one of said first or second activator coils.

4. The control system of claim 3 wherein said time delay circuit comprises a capacitor charging circuit connected between the output of said comparator and the transistor to prevent the transistor from rapidly switching on and off.

* * * * *